(12) United States Patent
Mori

(10) Patent No.: US 6,646,698 B2
(45) Date of Patent: Nov. 11, 2003

(54) LIQUID CRYSTAL DISPLAY HAVING A PLURALITY OF POLARIZING PLATES HAVING THE SAME POLARIZATION DEGREE

(75) Inventor: Eiichi Mori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/037,623

(22) Filed: Jan. 2, 2002

(65) Prior Publication Data
US 2003/0053011 A1 Mar. 20, 2003

(30) Foreign Application Priority Data
Sep. 14, 2001 (JP) .......................... 2001-279646

(51) Int. Cl.⁷ ................................. G02F 1/13
(52) U.S. Cl. ............................................. 349/96
(58) Field of Search ............................. 349/96

(56) References Cited

U.S. PATENT DOCUMENTS

| | | | |
|---|---|---|---|
| 4,387,133 A | 6/1983 | Ichikawa et al. | 428/215 |
| 4,592,623 A | 6/1986 | Yamamoto et al. | 350/397 |
| 5,838,415 A | 11/1998 | Hayashi et al. | 349/161 |
| 5,892,561 A | 4/1999 | Suzuki et al. | 349/122 |
| 6,094,245 A | 7/2000 | Ochi et al. | 349/96 |
| 6,099,758 A * | 8/2000 | Verrall et al. | 349/96 |
| 6,392,727 B1 * | 5/2002 | Larson et al. | 349/96 |

FOREIGN PATENT DOCUMENTS

| | | |
|---|---|---|
| JP | 57-020718 | 2/1982 |
| JP | 57-076530 | 5/1982 |
| JP | 59-077401 | 5/1984 |
| JP | 09-090333 | 4/1997 |
| JP | 09-113927 | 5/1997 |
| JP | 09-197364 | 7/1997 |
| JP | 10-133196 | 5/1998 |
| JP | 2000-180843 | 6/2000 |

* cited by examiner

Primary Examiner—James Dudek
(74) Attorney, Agent, or Firm—Greer, Burns & Crain, Ltd.

(57) ABSTRACT

A liquid crystal display including a liquid crystal layer having first and second surfaces opposite to each other; a first polarizing plate opposed to the first surface of the liquid crystal layer and having a first polarization axis; and a second polarizing plate opposed to the second surface of the liquid crystal layer and having a second polarization axis perpendicular to the first polarization axis and given polarization degree. The liquid crystal display further includes a third polarizing plate opposed to the first polarizing plate and having the second polarization axis and the given polarization degree.

5 Claims, 8 Drawing Sheets

LIQUID CRYSTAL DISPLAY HAVING A PLURALITY OF POLARIZING PLATES HAVING THE SAME POLARIZATION DEGREE

BACKGROUND OF THE INVENTION

1. Field of the Invention

The present invention relates to a liquid crystal display.

2. Description of the Related Art

Conventionally known is a liquid crystal display including a transmission type liquid crystal panel and a backlight unit arranged on the back side of the liquid crystal panel in parallel thereto for illuminating the liquid crystal panel from the back side thereof. The backlight unit has the same shape as that of the liquid crystal panel. The liquid crystal panel is configured by sealing a liquid crystal material between a pair of transparent electrode substrates opposed to each other through a seal, spacer, etc. A polarizing plate is bonded to each transparent electrode substrate of the liquid crystal panel.

FIGS. 1 and 2 show a general liquid crystal display in the prior art. As shown in FIGS. 1 and 2, light emitted from a backlight unit 2 is directed on a polarizing plate 4 having a first polarization axis. The polarizing plate 4 transmits only a part of the incident light oscillating in a direction parallel to the polarization axis of the polarizing plate 4, and absorbs the remaining part of the incident light. As a result, the transmitted light through the polarizing plate 4 becomes linearly polarized light. In the display state of maximum gray level, i.e., in the white display state shown in FIG. 1, the polarization plane of the above linearly polarized light is rotated 90° by a liquid crystal layer 6 as shown by reference numeral 7 to enter a polarizing plate 8 located on the exit side of the liquid crystal layer 6. The polarizing plate 8 has a second polarization axis perpendicular to the polarization axis of the polarizing plate 4, so that the incident light on the polarizing plate 8 from the liquid crystal layer 6 is transmitted through the polarizing plate 8 to display a white image. Conversely, in the display state of zero gray level, i.e., in the black display state shown in FIG. 2, the polarization plane of the transmitted light through the polarizing plate 4 is not rotated by the liquid crystal layer 6, but the outgoing light from the polarizing plate 4 is transmitted through the liquid crystal layer 6 as it is. Since the polarization plane of the transmitted light through the liquid crystal layer 6 is perpendicular to the polarization axis of the polarizing plate 8, the transmitted light through the liquid crystal layer 6 is almost absorbed by the polarizing plate 8 to display a black image.

In a recent liquid crystal display, the luminance has become higher year after year, and the contrast has also been improved. With an increase in luminance, the amount of light 9 leaked from the polarizing plate 8 in the black display state as shown in FIG. 2 increases to result in an increase in luminance in the black display state, causing a problem in display quality. This phenomenon is referred to as dark defect. For example, a movie picture stored in a digital versatile disk (DVD) includes many dark images. If the dark images are displayed with brightness due to the above dark defect, the display quality of the movie picture is degraded and the movie picture is accordingly very hard to view. Such a problem is caused by the imbalance in performance between a light source (backlight unit) and polarizing plates.

The ability of the backlight unit continues to be improved year after year to achieve a high luminance. However, although the luminance of the backlight in the zero gray level has been improved, the light shielding ability of the polarizing plate has not yet been sufficient. That is, in the structure that a pair of polarizing plates having perpendicular polarization axes are located on the opposite sides of a liquid crystal layer, the leakage of light from the polarizing plate located on the exit side of the liquid crystal layer in the black display state cannot be completely prevented. Japanese Patent Laid-open No. 2000-180843 discloses a liquid crystal display including a plurality of polarizing plates arranged on the entrance side of a liquid crystal panel to improve heat resistance and light resistance. By arranging such a plurality of polarizing plates on the entrance side of the liquid crystal panel, most of unwanted light can be absorbed by the first polarizing plate (rearmost polarizing plate) to thereby reduce a thermal burden on the next polarizing plate, thus improving heat resistance and light resistance. However, this structure is considered to have little effect in preventing the leakage of light in the black display state to improve the contrast.

Japanese Patent Laid-open No. Hei 10-133196 discloses a liquid crystal display including a plurality of polarizing plates arranged on the exit side of a liquid crystal panel, wherein the polarizing plates have the same polarization axis. In this structure, the inside polarizing plate adjacent to the liquid crystal panel has a low polarization degree and the outside polarizing plate has a high polarization degree, thereby dispersing heat generated in the polarizing plates. This liquid crystal display is effective for a liquid crystal projector having a high heating value. However, a plurality of polarizing plates each having a high polarization degree are required for the improvement in contrast, so that the this liquid crystal display is not suitable for the improvement in total contrast, i.e., the improvement in display quality.

SUMMARY OF THE INVENTION

It is therefore an object of the present invention to provide a liquid crystal display which can be improved in contrast to thereby improve the display quality.

In accordance with an aspect of the present invention, there is provided a liquid crystal display comprising a liquid crystal layer having first and second surfaces opposite to each other; a first polarizing plate opposed to said first surface of said liquid crystal layer and having a first polarization axis; a second polarizing plate opposed to said second surface of said liquid crystal layer and having a second polarization axis perpendicular to said first polarization axis and a given polarization degree; and a third polarizing plate opposed to said second polarizing plate and having said second polarization axis and said given polarization degree.

Thus, the second and third polarizing plates having the same polarization axis and polarization degree are arranged on the exit side of the liquid crystal layer, so that the transmittance of the front (outside) polarizing plate in the black display state can be suppressed. Furthermore, a reduction in transmittance of the front polarizing plate in the display state other than the black display state can be minimized. As a result, the contrast of a display image can be improved, and the viewing angle can also be improved by the improvement in contrast.

Preferably, said third polarizing plate is bonded to said second polarizing plate to form a polarizing plate unit. The polarizing plate unit comprises a first adhesive layer opposed to said liquid crystal layer, a first protective layer formed on said first adhesive layer, a first polarizer formed on said first protective layer, a second protective layer formed on said first polarizer, a second adhesive layer formed on said second protective layer, a third protective layer formed on said second adhesive layer, a second polarizer formed on said third protective layer, a fourth protective layer formed on said second polarizer, and a protective film formed on said fourth protective layer. Preferably, the liquid crystal display further comprises a touch panel interposed between said second polarizing plate and said third polarizing plate; said touch panel being bonded to said second polarizing plate; said third polarizing plate being bonded to said touch panel.

In accordance with another aspect of the present invention, there is provided a liquid crystal display comprising a liquid crystal panel having a pair of transparent substrates and a liquid crystal layer sealed between said transparent substrates; a first polarizing plate opposed to one of said transparent substrates and having a first polarization axis; a second polarizing plate opposed to the other transparent substrate and having a second polarization axis perpendicular to said first polarization axis and a given polarization degree; and a third polarizing plate opposed to said second polarizing plate and having said second polarization axis and said given polarization degree.

Preferably, the liquid crystal display further comprises a touch panel interposed between said second polarizing plate and said third polarizing plate; said second polarizing plate being bonded to said liquid crystal panel; said touch panel being bonded to said second polarizing plate; said third polarizing plate being bonded to said touch panel.

In accordance with a further aspect of the present invention, there is provided electronic equipment having a liquid crystal display, said liquid crystal display comprising a liquid crystal layer having first and second surfaces opposite to each other; a first polarizing plate opposed to said first surface of said liquid crystal layer and having a first polarization axis; a second polarizing plate opposed to said second surface of said liquid crystal layer and having a second polarization axis perpendicular to said first polarization axis and a given polarization degree; and a third polarizing plate opposed to said second polarizing plate and having said second polarization axis and said given polarization degree.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 3:
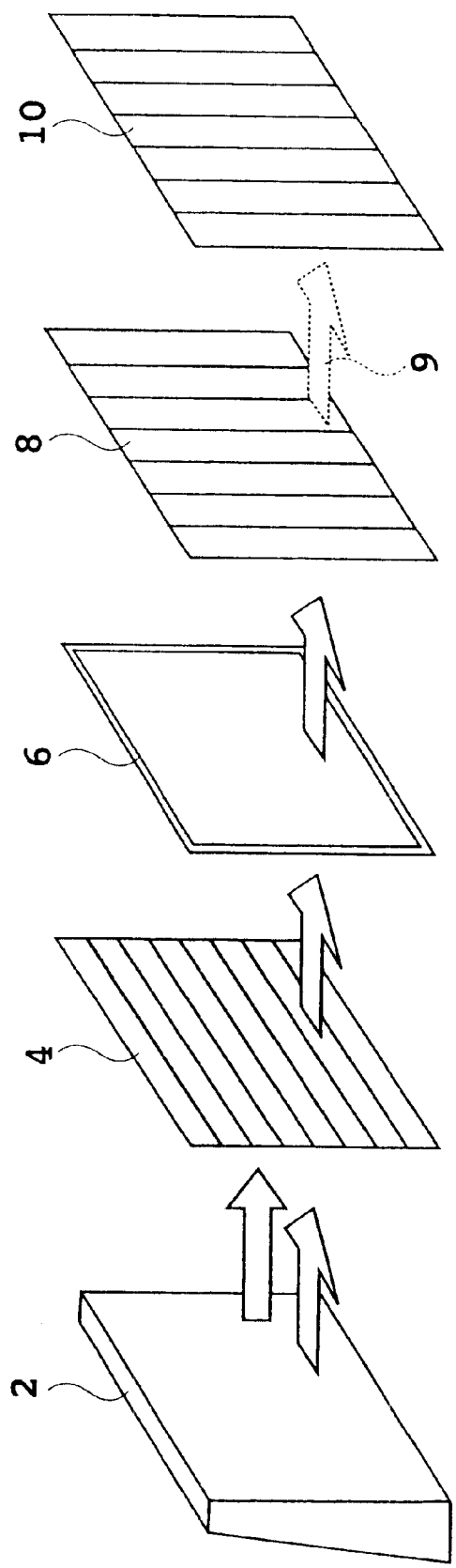
FIG. 3 is a perspective view showing the principle of the present invention.

The principle of the present invention will first be described with reference to FIG. 3. Light emitted from a backlight unit 2 is directed on a polarizing plate 4 having a first polarization axis. The polarizing plate 4 transmits only a part of the incident light oscillating in a direction parallel to the polarization axis of the polarizing plate 4, and absorbs the remaining part of the incident light. As a result, the transmitted light through the polarizing plate 4 becomes linearly polarized light. In the display state of zero gray level, i.e., in the black display state, the polarization plane of the transmitted light through the polarizing plate 4 is not rotated by a liquid crystal layer 6, but the outgoing light from the polarizing plate 4 is transmitted through the liquid crystal layer 6 as it is. A polarizing plate 8 located on the exit side of the liquid crystal layer 6 has a second polarization axis perpendicular to the polarization axis of the polarizing plate 4, and has a given polarization degree (e.g., 99.95%).

Figure 1:
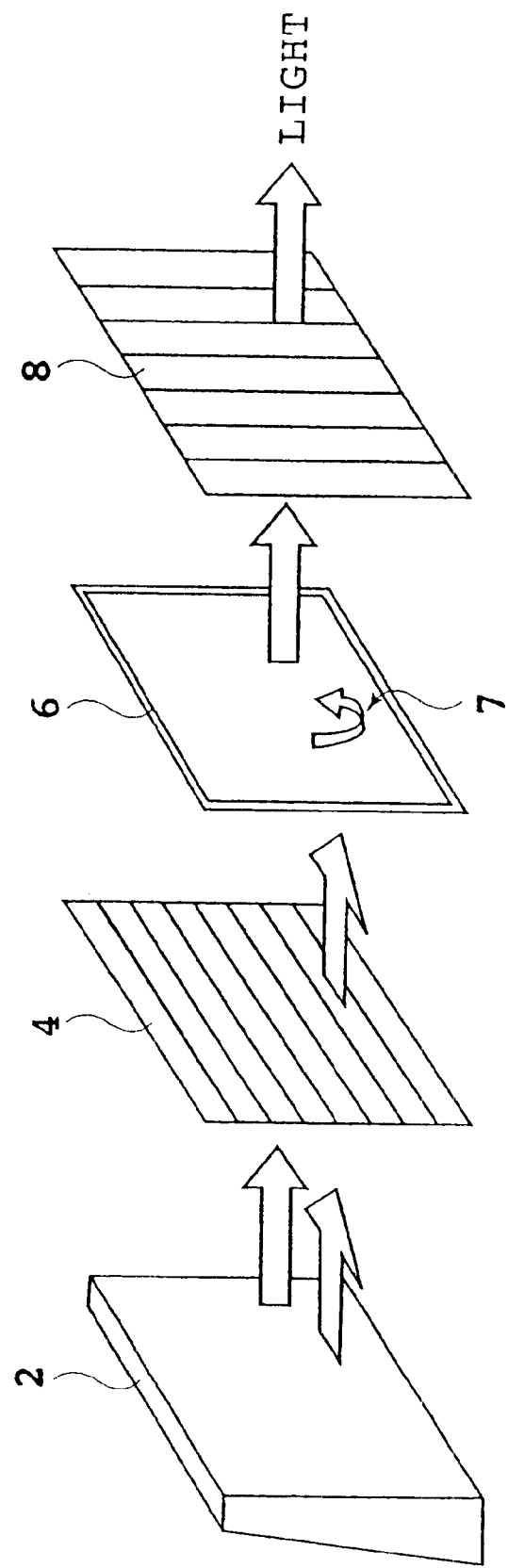
FIG. 1 is a perspective view illustrating the operation of a conventional liquid crystal display in the white display state.
Figure 2:
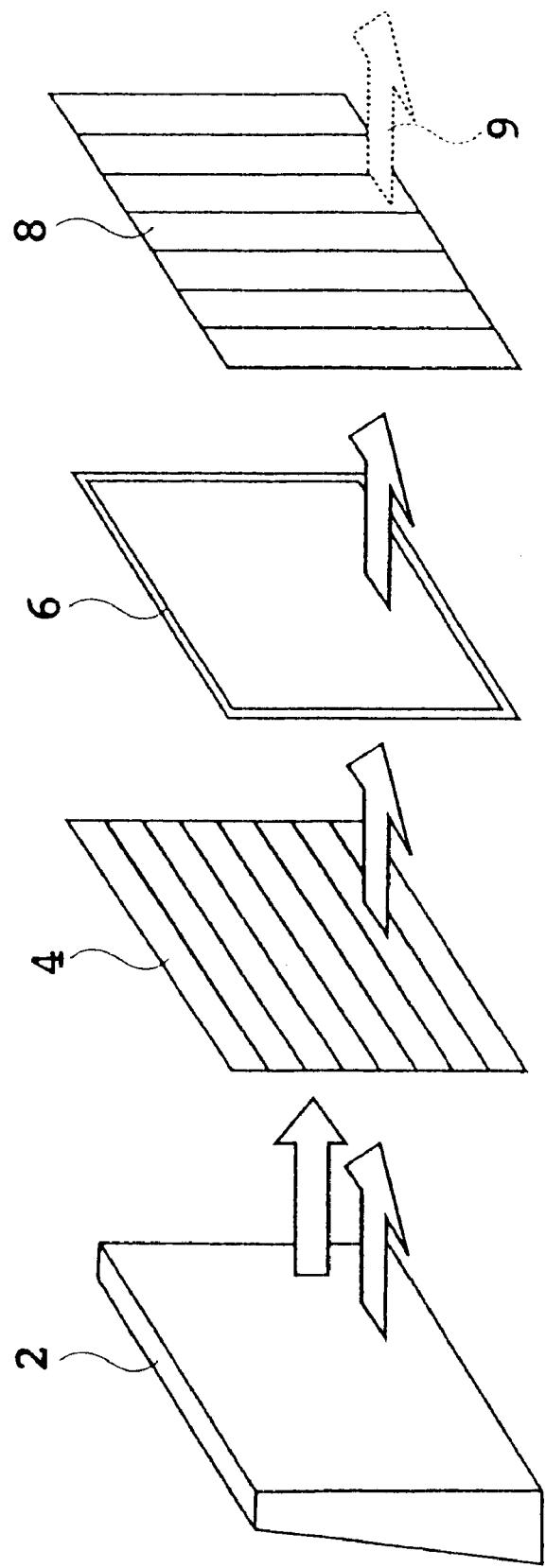
FIG. 2 is a view, similar to FIG. 1, illustrating the operation in the black display state.

The above configuration is similar to that of the conventional liquid crystal display shown in FIG. 2. The present invention is characterized in that an additional polarizing plate 10 having the same polarization axis and polarization degree as those of the polarizing plate 8 is located on the exit side of the liquid crystal layer 6 in proximity to the polarizing plate 8. With the configuration that the polarizing plate 10 having the same polarization axis and polarization degree as those of the polarizing plate 8 is located on the exit side of the liquid crystal layer 6, light 9 leaked from the polarizing plate 8 in the black display state can be completely blocked by the polarizing plate 10, thereby preventing an increase in luminance in the black display state. As a result, the contrast of the liquid crystal display can be improved to thereby improve the display quality.

Figure 4:
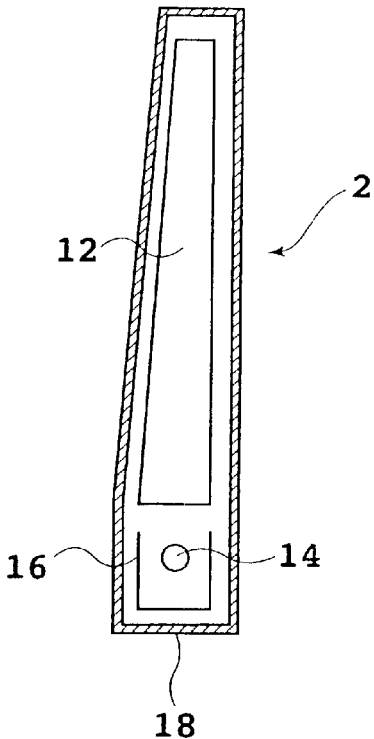
FIG. 4 is a sectional view of a backlight unit.

FIG. 4 is a schematic sectional view of the backlight unit 2. Reference numeral 12 denotes a light guide plate. Light emitted from a cold-cathode tube 14 enters the light guide plate 12 from its side surface directly or after reflection by a reflector 16. The light having entered the light guide plate 12 repeats multiple reflection inside the light guide plate 12 and on a reflection plate (not shown) provided on a rear surface of the light guide plate 12, thereafter outgoing from a front surface of the light guide plate 12. Reference numeral 18 denotes a plastic frame.

Figure 5:
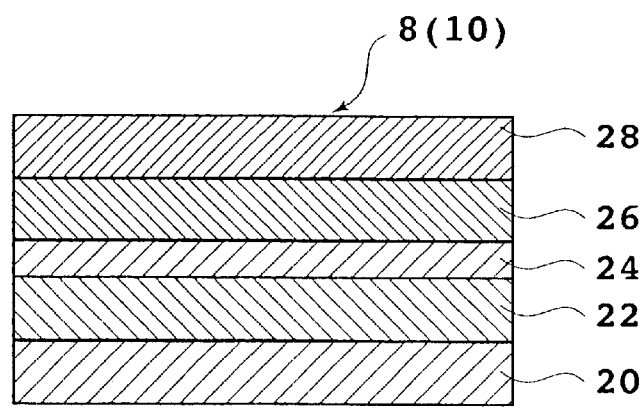
FIG. 5 is a sectional view of a polarizing plate.

FIG. 5 is a sectional view of the polarizing plate 8 or 10. The polarizing plate 8 or 10 is composed of an adhesive layer 20, a protective layer 22 formed on the adhesive layer 20, a polarizer 24 formed on the protective layer 22, a protective layer 26 formed on the polarizer 24, and a protective film 28 formed on the protective layer 26. The protective layer 22 is formed of triacetyl cellulose, for example. The polarizer 24 is formed from a polyvinyl alcohol film. It is important to improve the transmittance and polarization degree of a polarizing plate for the improvement of the polarizing plate. The transmittance may be classified generally into three kinds as shown in Table according to the manner of use of polarizing plates, that is, the manner of combination of polarizing plates.

TABLE

| Transmittance (%) | | | Polarization |
|---|---|---|---|
| Single | Parallel | Perpendicular | Degree (%) |
| 43.2 | 37.5 | 0.02 | 99.95 |

In Table, "Single" means the case where a single polarizing plate is used, and "Polarization Degree" is the ratio of polarized light to transmitted light through the polarizing plate. That is, the transmitted light is partially polarized light, which is regarded as the composition of natural light and and polarized light. In this regard, the polarization degree is a value represented by Ip/(Ip+In) where In is the intensity of natural light and Ip is the intensity of polarized light. In Table, "Parallel" means the case where two polarizing plates having parallel polarization axes are arranged. This case corresponds to the white display state in a liquid crystal display. In Table, "Perpendicular" means the case where two polarizing plates are arranged so that their polarization axes are perpendicular to each other. This case corresponds to the black display state in a liquid crystal display.

The polarization degree depends on the uniformity of molecular alignment in a polarizer as a basic element of the polarizing plate. While the uniformity of molecular alignment has conventionally been improved by making various considerations on a drawing method, molecule permeation method, etc. in a manufacturing process for a polarizing plate, the maximum polarization degree at present is about 99.97%. The increase in the polarization degree causes a reduction in transmittance, so that the improvement both in the polarization degree and in the transmittance is difficult. According to the present invention, a plurality of polarizing plates are arranged on the exit side of a liquid crystal layer so that the polarization axis of these polarizing plates are parallel to each other and perpendicular to the polarization axis of a polarizing plate located on the entrance side of the liquid crystal layer, thereby preventing the leakage of light from the front polarizing plate in the black display state. Further, the polarization degrees of the polarizing plates arranged on the exit side of the liquid crystal layer are set equal to each other, thereby minimizing the reduction in the transmittance of the front polarizing plate in the display state other than the black display state.

Figure 6:
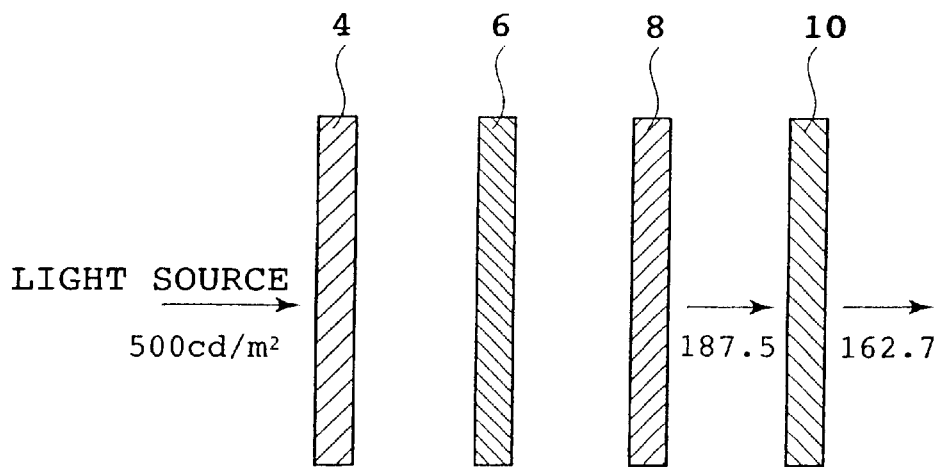
FIG. 6 is a sectional view illustrating the luminance in the white display state according to the liquid crystal display of the present invention.

As shown in FIG. 6, the polarizing plates 4, 8, and 10 having the characteristics shown in Table 1 are arranged on the opposite sides of the liquid crystal layer 6 in such a manner that the polarizing plate 4 is located on the entrance side of the liquid crystal layer 6 and the polarizing plates 8 and 10 are located on the exit side of the liquid crystal layer 6. The polarization axes of the polarizing plates 8 and 10 are parallel to each other, and they have the same polarization degree of 99.95%. The polarization axis of the polarizing plate 4 is perpendicular to the polarization axis of the polarizing plates 8 and 10. The polarization degree of the polarizing plate 4 is also 99.95%.

The contrast is known as a degree of display sharpness, and it is defined as the ratio of the luminance in the white display state to the luminance in the black display state. Assuming that the luminance of incident light from the light source (backlight unit) onto the polarizing plate 4 is 500 cd/m$^2$ and that the transmittance of the liquid crystal layer 6 is 100%, the luminance of light transmitted through the polarizing plate 8 is calculated as follows:

The luminance in the white display state, i.e., in the parallel condition is 500 cd/m$^2$×0.375=187.5 cd/m$^2$.

The luminance in the black display state, i.e., in the perpendicular condition is 500 cd/m$^2$×0.0002=0.1 cd/m$^2$.

Accordingly, the contrast is 187.5/0.1=1875.

By adding the polarizing plate 10, the final luminance of the liquid crystal display becomes as follows:

It is assumed that 99.95% of the incident light from the polarizing plate 8 onto the polarizing plate 10 is polarized and 0.05% of this incident light is unpolarized to be absorbed by the polarizing plate 10. In the case that light is transmitted through the polarizing plates 8 and 10 having the same polarization axis, the transmission loss is suppressed as 0.375/0.432=86.8%. Accordingly, the luminance in the white display state is 187.5 cd/m$^2$×0.868×0.9995=162.7 cd/m$^2$.

In the black display state, the polarization axis of the transmitted light through the polarizing plate 8 is different from the polarization axis of the polarizing plate 10, and a transmission loss in the polarizing plate 10 as a single member is produced. Accordingly, the luminance in the black display state is 0.1 cd/m$^2$×0.432=0.0432 cd/m$^2$.

As a result, the contrast is 162.7/0.0432=3766. Thus, the contrast can be greatly improved by the addition of the polarizing plate 10. In this case, the final transmittance of the liquid crystal display shown in FIG. 6 becomes as follows:

The final transmittance in the white display state is 162.7/500=32.54%.

The final transmittance in the black display state is 0.0432/500=0.00864%.

Thus, the final transmittance in the black display state can be greatly suppressed to 0.00864% by the addition of the polarizing plate 10 in comparison with the fact that the final transmittance in the case of only the polarizing plate 8 is 0.1/500=0.02%.

In the present invention, a polarizing plate having a polarization degree as high as 99.95% is suitable as each polarizing plate located on the exit side of the liquid crystal layer as in this preferred embodiment. By locating a plurality of polarizing plates having a high polarization degree and the same polarization axis on the exit side of the liquid crystal layer, the transmittance in the black display state can be greatly suppressed. Accordingly, the dark defect can be suppressed to thereby improve the contrast. Further, the viewing angle can also be improved by the improvement in contrast.

While the two polarizing plates 8 and 10 are arranged on the exit side of the liquid crystal layer 6 in this preferred embodiment, three or more polarizing plates may be arranged on the exit side of the liquid crystal layer according to specifications required. In this case, however, a reduction in luminance in the white display state is unavoidable, so attention must be paid in this case. It is desirable to minimize the spacing between the adjacent polarizing plates located on the exit side of the liquid crystal layer from the viewpoint of prevention of light scattering. Preferably, the two polarizing plates 8 and 10 are bonded together.

Figure 7:
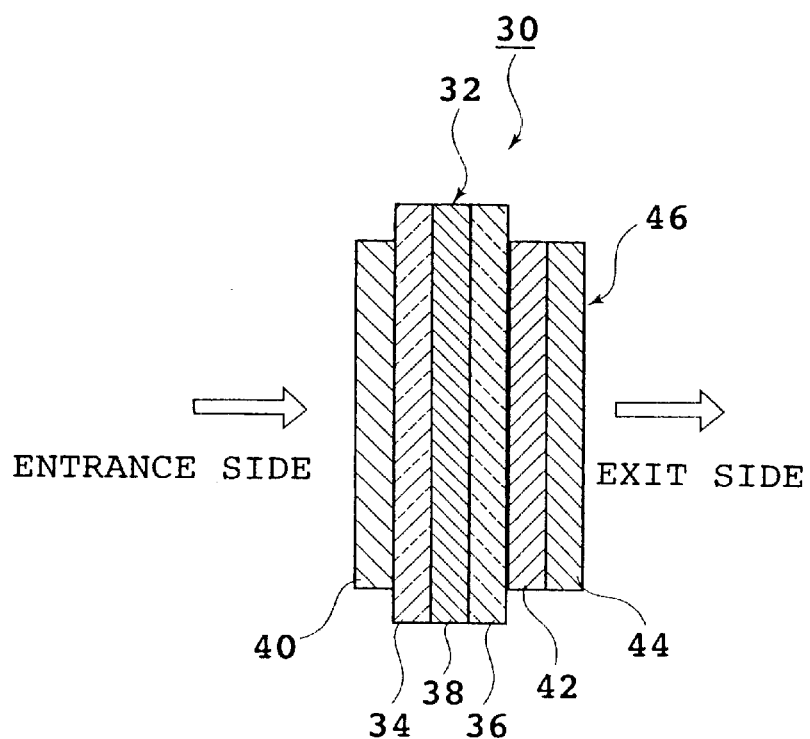
FIG. 7 is a schematic sectional view of a liquid crystal display according to a first preferred embodiment of the present invention.

FIG. 7 is a schematic sectional view of a liquid crystal display 30 according to a first preferred embodiment of the present invention. Reference numeral 32 denotes a liquid crystal panel composed of a pair of glass substrates 34 and 36 and a liquid crystal layer 38 sealed between the glass substrates 34 and 36. As well known in the art, a transparent electrode is formed on the surface of each of the glass substrates 34 and 36. A polarizing plate 40 having a first polarization axis is bonded to the entrance side of the liquid crystal panel 32, and a polarizing plate unit 46 is bonded to the exit side of the liquid crystal panel 32. The polarizing plate unit 46 is configured by bonding two polarizing plates 42 and 44 each having a second polarization axis perpendicular to the first polarization axis of the polarizing plate 40. The polarizing plates 42 and 44 have the same polarization degree, e.g., 99.95%.

Figure 8A:
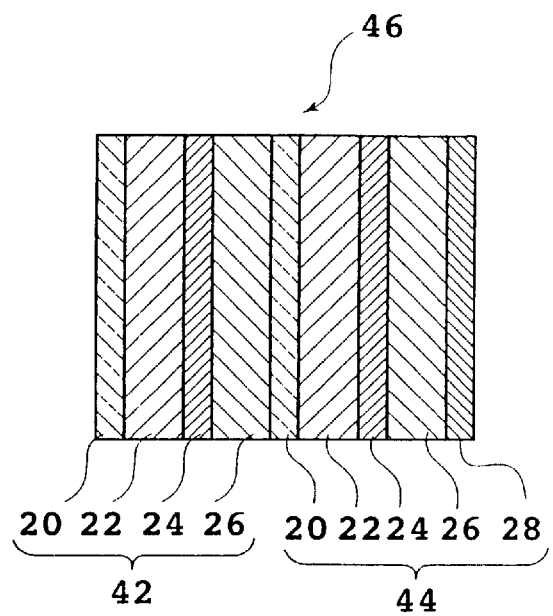
FIG. 8A is a sectional view of a polarizing plate unit.
Figure 8B:
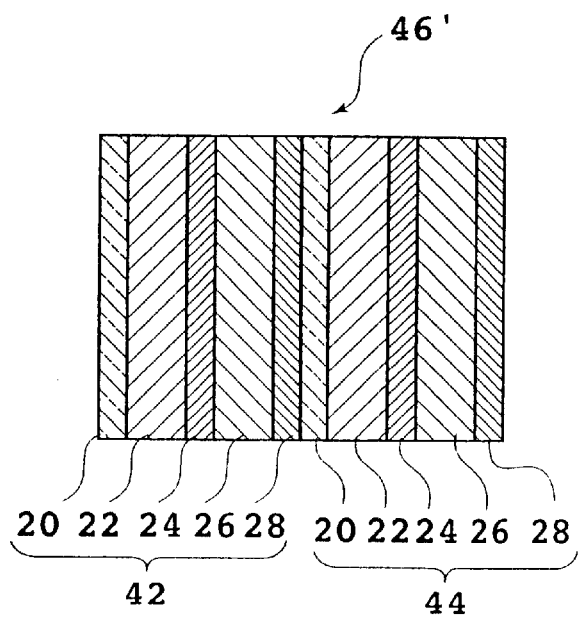
FIG. 8B is a sectional view of a modification of the polarizing plate unit.

FIG. 8A is a sectional view of the polarizing plate unit 46. The polarizing plate unit 46 has a multilayer structure consisting of a first adhesive layer 20 opposed to the liquid crystal panel 32, a first protective layer 22 formed on the first adhesive layer 20, a first polarizer 24 formed on the first protective layer 22, a second protective layer 26 formed on the first polarizer 24, a second adhesive layer 20 formed on the second protective layer 26, a third protective layer 22 formed on the second adhesive layer 20, a second polarizer 24 formed on the third protective layer 22, a fourth protective layer 26 formed on the second polarizer 24, and a protective film 28 formed on the fourth protective layer 26. That is, the first adhesive layer 20, the first protective layer 22, the first polarizer 24, and the second protective layer 26 constitute the polarizing plate 42. The second adhesive layer 20, the third protective layer 22, the second polarizer 24, the fourth protective layer 26, and the protective layer 28 constitute the polarizing plate 44. Each protective layer 22 is formed of triacetyl cellulose, for example, and each polarizer 24 is formed from a polyvinyl alcohol film, for example. The adhesive layer 20 of the polarizing plate 42 is bonded to the liquid crystal panel 32. The adhesive layer 20 of the polarizing plate 44 is bonded to the protective layer 26 of the polarizing plate 42. FIG. 8B shows a modification 46' of the polarizing plate unit 46. The polarizing plate unit 46' shown in FIG. 8B further includes an additional protective film 28 formed on the protective layer 26 of the polarizing plate 42. In this case, the adhesive layer 20 of the polarizing plate 44 is bonded to the protective film 28 of the polarizing plate 42.

Figure 9:
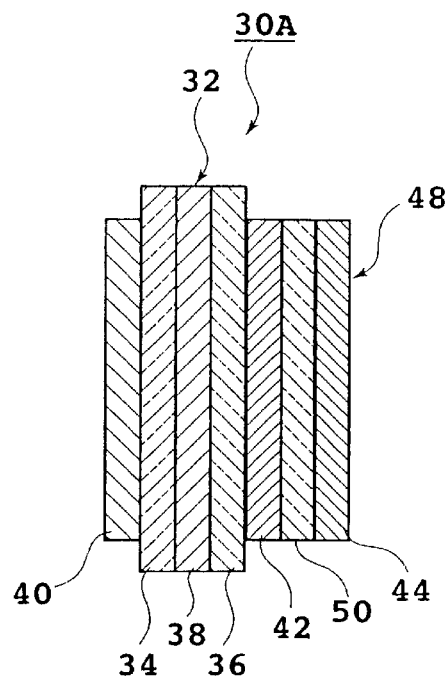
FIG. 9 is a schematic sectional view of a liquid crystal display according to a second preferred embodiment of the present invention.

FIG. 9 is a schematic sectional view of a liquid crystal display 30A according to a second preferred embodiment of the present invention. In this preferred embodiment, the liquid crystal display 30A is composed of a liquid crystal panel 32, a polarizing plate 40 bonded to the entrance side of the liquid crystal panel 32, and a polarizing plate unit 48 bonded to the exit side of the liquid crystal panel 32. The polarizing plate unit 48 is composed of a polarizing plate 42 bonded to the liquid crystal panel 32, a touch panel glass substrate 50 bonded to the polarizing plate 42, and a polarizing plate 44 bonded to the touch panel glass substrate 50. As in the first preferred embodiment shown in FIG. 7, the polarizing plates 42 and 44 have the same polarization axis and polarization degree, and the polarization axis of each of the polarizing plates 42 and 44 is perpendicular to the polarization axis of the polarizing plate 40. According to the liquid crystal displays 30 and 30A of the first and second preferred embodiments, the transmittance of the polarizing plates 42 and 44 in the black display state can be greatly suppressed to thereby prevent the dark defect and improve the contrast.

Figure 10:
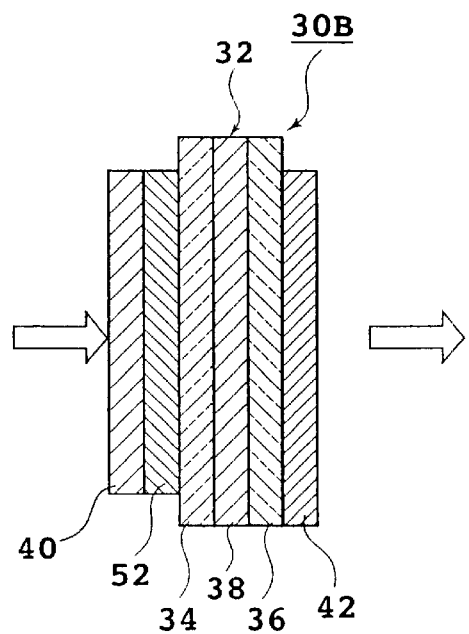
FIG. 10 is a schematic sectional view of a liquid crystal display according to a third preferred embodiment of the present invention.

FIG. 10 is a schematic sectional view of a liquid crystal display 30B according to a third preferred embodiment of the present invention. In this preferred embodiment, two polarizing plates 40 and 52 having parallel polarization axes are arranged on the entrance side of the liquid crystal panel 32. The polarizing plate 52 is bonded to the liquid crystal panel 32, and the polarizing plate 40 is bonded to the polarizing plate 52. Also in this preferred embodiment wherein the plural polarizing plates 40 and 52 are located on the entrance side of the liquid crystal panel 32, a similar effect can be exhibited. However, the transmitted light through the polarizing plate 52 scatters during passing through the liquid crystal layer 38 and the glass substrates 34 and 36 until reaching the polarizing plate 42 located on the exit side of the liquid crystal panel 32. Accordingly, the effect is less than that in the configuration of the first or second preferred embodiment wherein a plurality of polarizing plates are located on the exit side of the liquid crystal panel.

Figure 11A:
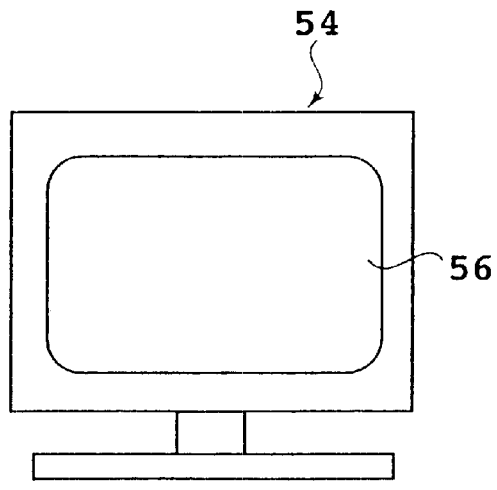
FIG. 11A is a front view of an LCD monitor adopting the present invention.
Figure 11B:
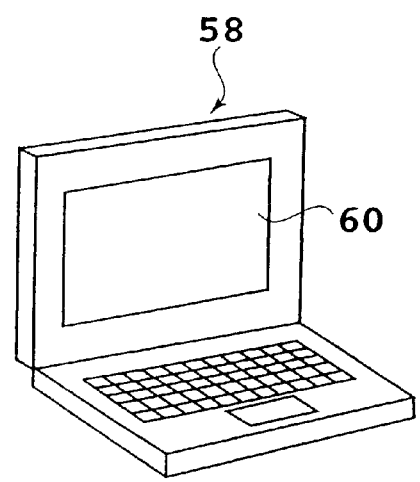
FIG. 11B is a perspective view of a notebook personal computer adopting the present invention.
Figure 11C:
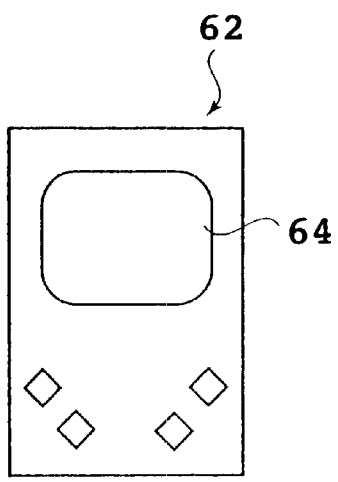
FIG. 11C is a front view of a PDA adopting the present invention.
Figure 11D:
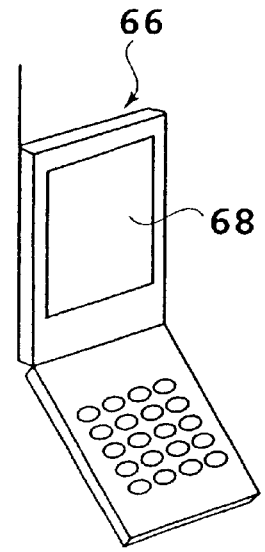
FIG. 11D is a perspective view of a mobile telephone adopting the present invention.

FIGS. 11A to 11D illustrate various kinds of electronic equipment adopting the liquid crystal display of the present invention. As shown in FIG. 11A, a liquid crystal display 56 according to the present invention is adopted as a display of an LCD monitor 54. AS shown in FIG. 11B, a liquid crystal display 60 according to the present invention is adopted as a display of a notebook personal computer 58. As shown in FIG. 11C, a liquid crystal display 64 according to the present invention is adopted as a display of a PDA 62. As shown in FIG. 11D, a liquid crystal display 68 according to the present invention is adopted as a display of a mobile telephone 66.

According to the present invention as described above, black-level light can be suppressed without a reduction in transmittance in the white display state, so that the contrast of a display image can be improved and the viewing angle can also be improved by the improvement in contrast.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A liquid crystal display comprising:
   a liquid crystal layer having first and second surfaces opposite to each other;
   a first polarizing plate opposed to said first surface of said liquid crystal layer and having a first polarization axis;
   a second polarizing plate opposed to said second surface of said liquid crystal layer and having a second polarization axis perpendicular to said first polarization axis and a given polarization degree; and
   a third polarizing plate opposed to said second polarizing plate and having said second polarization axis and said given polarization degree,
   wherein said third polarizing plate is bonded to said second polarizing plate to form a polarizing plate unit, and
   wherein said polarizing plate unit comprises a first adhesive layer opposed to said liquid crystal layer, a first protective layer formed on said first adhesive layer, a first polarizer formed on said first protective layer, a second protective layer formed on said first polarizer, a second adhesive layer formed on said second protective layer, a third protective layer formed on said second adhesive layer, a second polarizer formed on said third protective layer, a fourth protective layer formed on said second polarizer, and a first protective film formed on said fourth protective layer.

2. A liquid crystal display according to claim 1, wherein said polarizing plate unit further comprises a second protective film interposed between said second protective layer and said second adhesive layer.

3. A liquid crystal display comprising:
   a liquid crystal layer having first and second surfaces opposite to each other;
   a first polarizing plate opposed to said first surface of said liquid crystal layer and having a first polarization axis;
   a second polarizing plate opposed to said second surface of said liquid crystal layer and having a second polarization axis perpendicular to said first polarization axis and a given polarization degree;
   a third polarizing plate opposed to said second polarizing plate and having said second polarization axis and said given polarization degree; and
   a touch panel interposed between said second polarizing plate and said third polarizing plate,
   wherein said touch panel is bonded to said second polarizing plate; and
   wherein said third polarizing plate is bonded to said touch panel.

4. A liquid crystal display comprising:
   a liquid crystal panel having a pair of transparent substrates and a liquid crystal layer sealed between said transparent substrates;
   a first polarizing plate opposed to one of said transparent substrates and having a first polarization axis;
   a second polarizing plate opposed to the other transparent substrate and having a second polarization axis perpendicular to said first polarization axis and a given polarization degree; and
   a third polarizing plate opposed to said second polarizing elate and having said second polarization axis and said given polarization degree,
   wherein said third polarizing elate is bonded to said second polarizing plate to form a polarizing plate unit, and
   wherein said polarizing plate unit comprises a first adhesive layer opposed to said liquid crystal panel, a first protective layer formed on said first adhesive layer, a first polarizer formed on said first protective layer, a second protective layer formed on said first polarizer, a second adhesive layer formed on said second protective layer, a third protective layer formed on said second adhesive layer, a second polarizer formed on said third protective layer, a fourth protective layer formed on said second polarizer, and a protective film formed on said fourth protective layer.

5. A liquid crystal display comprising:
   a liquid crystal panel having a pair of transparent substrates and a liquid crystal layer sealed between said transparent substrates;
   a first polarizing plate opposed to one of said transparent substrates and having a first polarization axis;
   a second polarizing plate opposed to the other transparent substrate and having a second polarization axis perpendicular to said first polarization axis and a given polarization degree;
   a third polarizing plate opposed to said second polarizing plate and having said second polarization axis and said given polarization degree; and
   a touch panel interposed between said second polarizing plate and said third polarizing plate,
   wherein said second polarizing plate is bonded to said liquid crystal panel;
   wherein said touch panel is bonded to said second polarizing plate; and
   wherein said third polarizing plate is bonded to said touch panel.

* * * * *

UNITED STATES PATENT AND TRADEMARK OFFICE
CERTIFICATE OF CORRECTION

PATENT NO. : 6,646,698 B2
DATED : November 11, 2003
INVENTOR(S) : Eiichi Mori

It is certified that error appears in the above-identified patent and that said Letters Patent is hereby corrected as shown below:

<u>Column 9,</u>
Line 36, delete "elate" and insert -- plate -- therefor.

<u>Column 10,</u>
Line 1, delete "elate" and insert -- plate -- therefor.

Signed and Sealed this

Nineteenth Day of October, 2004

JON W. DUDAS
*Director of the United States Patent and Trademark Office*